US011999320B2

(12) United States Patent
Manjunath et al.

(10) Patent No.: US 11,999,320 B2
(45) Date of Patent: Jun. 4, 2024

(54) DYNAMIC SWEEP ANGLE MEASUREMENT FOR FAULT MONITORING OF WINDSHIELD WIPER SYSTEMS

(71) Applicant: Rosemount Aerospace Inc., Burnsville, MN (US)

(72) Inventors: Aruna Manjunath, Mysore (IN); Venkata Anil Kumar Mothe, Karnataka (IN); Prashant Vadgaonkar, Karnataka (IN)

(73) Assignee: ROSEMOUNT AEROSPACE INC., Burnsville, MN (US)

( * ) Notice: Subject to any disclaimer, the term of this patent is extended or adjusted under 35 U.S.C. 154(b) by 0 days.

(21) Appl. No.: 18/348,584

(22) Filed: Jul. 7, 2023

(65) Prior Publication Data

US 2023/0347848 A1    Nov. 2, 2023

Related U.S. Application Data

(62) Division of application No. 16/690,936, filed on Nov. 21, 2019, now Pat. No. 11,772,608.

(30) Foreign Application Priority Data

Aug. 14, 2019   (IN) .............................. 201911032887

(51) Int. Cl.
  *B60S 1/34*        (2006.01)
  *B60S 1/08*        (2006.01)
  *B60S 1/26*        (2006.01)
(52) U.S. Cl.
  CPC ............... *B60S 1/3409* (2013.01); *B60S 1/08* (2013.01); *B60S 1/26* (2013.01)

(58) Field of Classification Search
  None
  See application file for complete search history.

(56) References Cited

U.S. PATENT DOCUMENTS 5,355,061 A    10/1994  Forhan
5,404,085 A     4/1995  Resch et al.
(Continued)

FOREIGN PATENT DOCUMENTS

EP         0926025 A2    6/1999
WO    2009135820 A1   11/2009
(Continued)

OTHER PUBLICATIONS

Search Report issued in European Patent Application No. 19212942.7; Application Filing Date Dec. 2, 2019; Date of Mailing Jul. 3, 2020 (8 pages).
(Continued)

*Primary Examiner* — Natasha N Campbell
*Assistant Examiner* — Pradhuman Parihar
(74) *Attorney, Agent, or Firm* — CANTOR COLBURN LLP (57) ABSTRACT

A windshield wiper system (WWS) is provided and includes a wiper blade assembly drivable along a first sweep angle, an internal wiper trigger disposed to move with the wiper blade assembly, a measurement system configured to monitor a position of the internal wiper trigger from which a corresponding position of the wiper blade assembly relative to the first sweep angle is measurable and to output a sweep angle feedback signal corresponding to monitoring results and a controller. The controller is receptive of the sweep angle feedback signal.

11 Claims, 5 Drawing Sheets

(56) References Cited

U.S. PATENT DOCUMENTS

| | | |
|---|---|---|
| 9,061,657 B2 | 6/2015 | Natsume |
| 10,017,159 B2 | 7/2018 | Amagasa |
| 2006/0226802 A1 | 10/2006 | Marentette |
| 2016/0276899 A1 | 9/2016 | Ikeda |
| 2019/0016307 A1 | 1/2019 | Negi et al. |
| 2019/0061696 A1 | 2/2019 | Vadgaonkar et al. |
| 2020/0079324 A1* | 3/2020 | Hase ........................ G06T 7/12 |

FOREIGN PATENT DOCUMENTS

| | | |
|---|---|---|
| WO | 2018216506 A1 | 11/2018 |
| WO | WO-2018216506 A1 * | 11/2018 ............ B60S 1/0452 |

OTHER PUBLICATIONS

Search Report issued in European Patent Application No. 19212942.7; Application Filing Date Dec. 2, 2019; Date of Mailing Jun. 15, 2022 (6 pages).

Office Action issued in European Patent Application No. 19212942.7; Application Filing Date Dec. 2, 2019; Date of Mailing Jan. 2, 2024 (6 pages).

* cited by examiner

DYNAMIC SWEEP ANGLE MEASUREMENT FOR FAULT MONITORING OF WINDSHIELD WIPER SYSTEMS

CROSS REFERENCE TO RELATED APPLICATION

This application is a division of U.S. application Ser. No. 16/690,936 filed Nov. 21, 2019, which claims the benefit of Indian Patent Application No. 201911032887 filed Aug. 14, 2019, which is incorporated herein by reference in their entirety.

BACKGROUND

The following description relates to windshield wiper systems (WWSs) and, more specifically, to dynamic sweep angle measurement for fault monitoring of a WWS.

A WWS is typically employed on a vehicle, such as an aircraft, to clear moisture or foreign object debris from a windshield and to allow for improved visibility. For example, a WWS on an aircraft can be used to improve visibility for pilots or co-pilots during take-off or landing operations.

To ensure that a WWS provides for required coverage on a windshield, the WWS will generally be designed to move through a specific wipe or sweep angle. This sweep angle can be controlled with or without a four bar mechanism designed to configured the WWS to sweep through the specific angle and return to a park position. The WWS is not typically expected to have any movement or flutter when it is non-operational under all loading conditions.

BRIEF DESCRIPTION

According to an aspect of the disclosure, a windshield wiper system (WWS) is provided and includes a wiper blade assembly drivable along a first sweep angle, an internal wiper trigger disposed to move with the wiper blade assembly, a measurement system configured to monitor a position of the internal wiper trigger from which a corresponding position of the wiper blade assembly relative to the first sweep angle is measurable and to output a sweep angle feedback signal corresponding to monitoring results and a controller. The controller is receptive of the sweep angle feedback signal.

In accordance with additional or alternative embodiments, the controller is configured to control a driving of the wiper blade assembly in accordance with the sweep angle feedback signal.

In accordance with additional or alternative embodiments, the wiper blade assembly is configured to move across a windshield of a vehicle and includes a wiper arm and a wiper blade attached to the wiper arm.

In accordance with additional or alternative embodiments, the WWS further includes a motor, which is operable by a motor drive control signal output from the controller, and a mechanical gear train and four bar linkage operably interposed between the motor and the wiper blade assembly. The controller is configured to control the driving of the wiper blade assembly in accordance with the sweep angle feedback signal and in accordance with position, current and temperature feedback signals derived from the motor.

In accordance with additional or alternative embodiments, the internal wiper trigger is coupled to the wiper blade assembly.

In accordance with additional or alternative embodiments, the internal wiper trigger generates a magnetic field and the measurement system is responsive to the magnetic field to monitor the position of the internal wiper trigger.

In accordance with additional or alternative embodiments, the measurement system includes Hall Effect sensors positioned proximate to opposite ends of the second sweep angle and the Hall Effect sensors are configured to generate a variable duty cycle output responsive to the magnetic field and to issue the variable duty cycle output to the controller as the sweep angle feedback signal.

According to another aspect of the disclosure, a windshield wiper system (WWS) is provided and includes a wiper blade assembly drivable along a first sweep angle, an internal wiper trigger disposed to move with the wiper blade assembly and along a second sweep angle corresponding to the first sweep angle, a measurement system configured to monitor a position of the internal wiper trigger relative to the second sweep angle from which a corresponding position of the wiper blade assembly relative to the first sweep angle is measurable and to output a sweep angle feedback signal corresponding to monitoring results and a controller. The controller is receptive of the sweep angle feedback signal.

In accordance with additional or alternative embodiments, the controller is configured to control a driving of the wiper blade assembly in accordance with at least the sweep angle feedback signal.

In accordance with additional or alternative embodiments, the wiper blade assembly is configured to move across a windshield of a vehicle and includes a wiper arm and a wiper blade attached to the wiper arm.

In accordance with additional or alternative embodiments, the second sweep angle is a same sweep angle as the first sweep angle.

In accordance with additional or alternative embodiments, the WWS further includes a motor, which is operable by a motor drive control signal output from the controller, and a mechanical gear train and four bar linkage operably interposed between the motor and the wiper blade assembly. The controller is configured to control the driving of the wiper blade assembly in accordance with the sweep angle feedback signal and in accordance with position, current and temperature feedback signals derived from the motor.

In accordance with additional or alternative embodiments, the internal wiper trigger is coupled to the wiper blade assembly.

In accordance with additional or alternative embodiments, the internal wiper trigger generates a magnetic field and the measurement system is responsive to the magnetic field to monitor the position of the internal wiper trigger relative to the second sweep angle.

In accordance with additional or alternative embodiments, the measurement system includes Hall Effect sensors positioned proximate to opposite ends of the second sweep angle and the Hall Effect sensors are configured to generate a variable duty cycle output responsive to the magnetic field and to issue the variable duty cycle output to the controller as the sweep angle feedback signal.

According to another aspect of the disclosure, a method of operating a windshield wiper system (WWS) is provided. The method includes driving a wiper blade assembly along a first sweep angle by a controller, monitoring a position of an internal wiper trigger disposed to move with the wiper blade assembly from which a corresponding position of the wiper blade assembly relative to the first sweep angle is measurable, outputting a sweep angle feedback signal corresponding to results of the monitoring to the controller and controlling the driving of the wiper blade assembly by the controller in accordance with at least the sweep angle feedback signal.

In accordance with additional or alternative embodiments, the controlling of the driving of the wiper blade assembly by the controller is executed in accordance with the sweep angle feedback signal and in accordance with motor position, motor current and motor temperature feedback signals.

In accordance with additional or alternative embodiments, the monitoring includes generating a magnetic field at an internal wiper trigger disposed to move with the wiper blade assembly and generating a variable duty cycle output responsive to the magnetic field for issuance to the controller as the sweep angle feedback signal.

In accordance with additional or alternative embodiments, the sweep angle feedback signal has a negligible parallax error.

In accordance with additional or alternative embodiments, the method further includes at least one of in-flight gear and shaft and real-time sweep angle monitoring based on the sweep angle feedback signal, computing a speed of a motor configured to drive the wiper blade assembly and facilitating an identification of ageing issues or failures of the motor, the wiper blade assembly or a gear train interposed between the motor and the wiper blade assembly.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features and advantages of the disclosure are apparent from the following detailed description taken in conjunction with the accompanying drawings in which:

These and other advantages and features will become more apparent from the following description taken in conjunction with the drawings.

DETAILED DESCRIPTION

A conventional WWS can include an intelligent device with a controller or processor that provides a motor commutation sequence and monitors system faults, an internal wiper trigger that detects an end of sweep position of an external wiper blade, a park sensor feedback system with an end of sweep (EoS) sensor that detects the end of sweep position of the WWS by monitoring the internal wiper trigger, Hall sensor feedback to measure a speed of a motor of the WWS, motor current feedback to monitor motor winding currents, motor winding temperature feedback to monitor temperatures of the motor windings, a mechanical gear train and four bar link mechanism and a wiper arm and blade. The mechanical gear train and the four bar link mechanism converts rotary motion of the motor to oscillatory motion and the wiper arm and blade is driven by the oscillatory motion to wipe the windshield.

Thus, in the conventional WWS, it is seen that Hall sensors are used to detect a speed of the motor. As such, any disconnections in Hall sensor signal lines can lead to system failures. In addition, the conventional WWS can include a worm gear that acts as a mechanical brake and a failure of the worm gear teeth can lead to an undesirable movement of the WWS from a park position. The conventional WWS does not have mechanism to detect this movement due to worm gear failure or other mechanical failures. That is, in the conventional WWS, Hall sensors are used for motor speed measurement but Hall sensors measure the speed only at motor ends and do not account for losses or faults in the mechanical gear train.

As will be described below, a WWS is provided and configured with a capability of measuring a sweep angle of wiper blades by continuously monitoring a sweep angle of an internal wiper trigger. The continuous monitoring of the sweep angle is accomplished by way of strategically placed pulse width modulation (PWM) output linear Hall Effect sensors inside a wiper module. Thus, while a conventional WWS can be characterized in that the internal wiper trigger is used only to detect an EoS of external wiper blades, the internal wiper trigger experiences same external loads as that of the external wiper blades and this internal wiper trigger can be leveraged for sweep angle measurement of the external wiper blades as both the internal wiper trigger and the external wiper blades have the same sweep angle.

Figure 1:
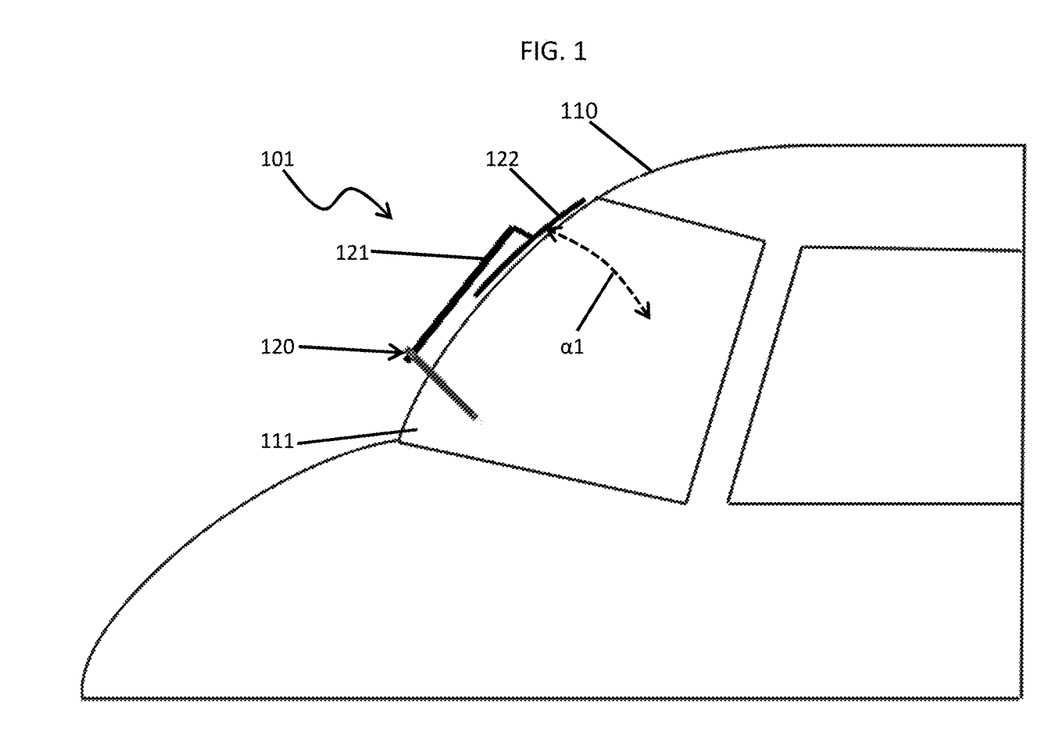
FIG. 1 is a schematic illustration of external components of a WWS in accordance with embodiments.
Figure 2:
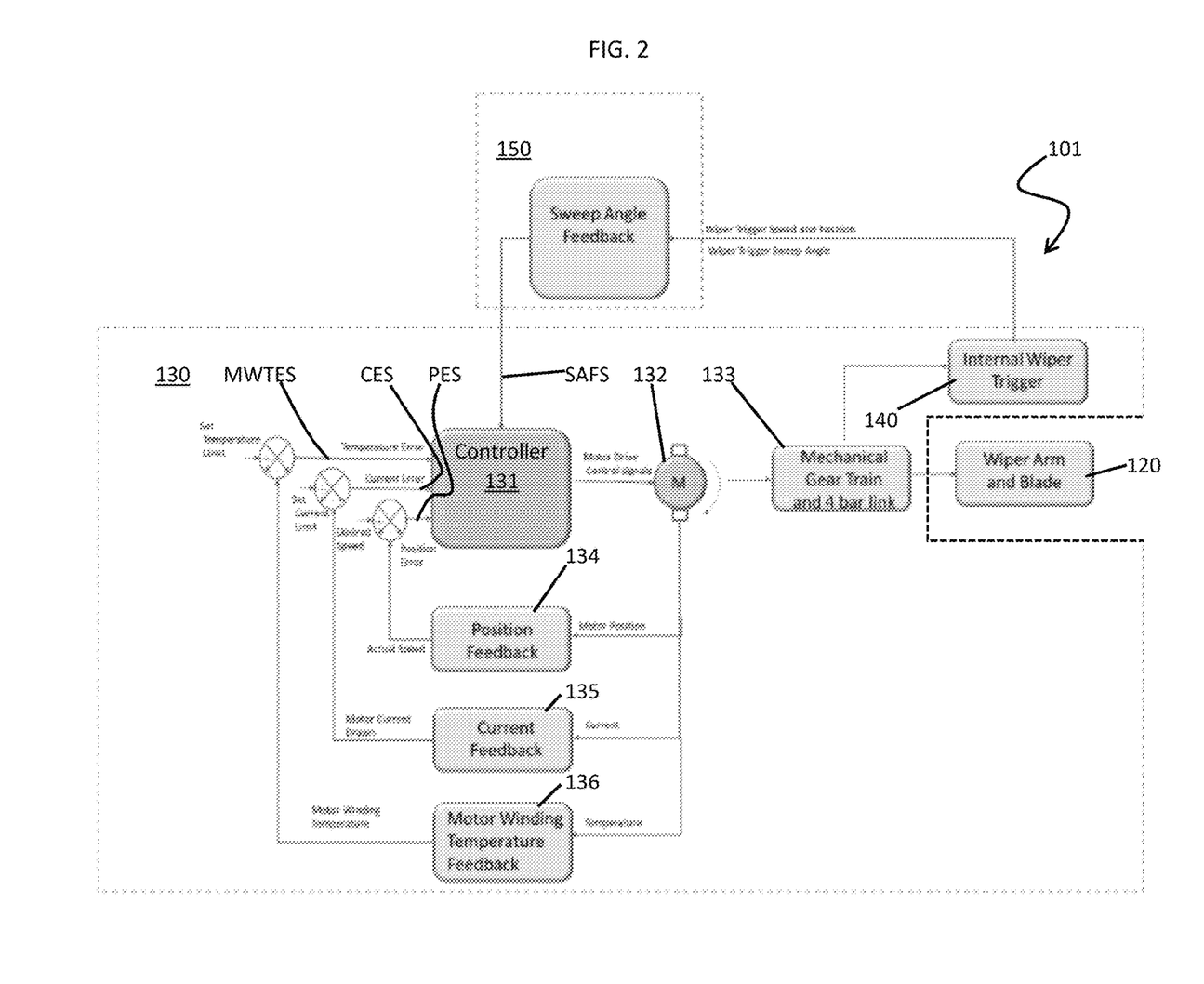
FIG. 2 is a schematic diagram of components of a WWS in accordance with embodiments.
Figure 3:
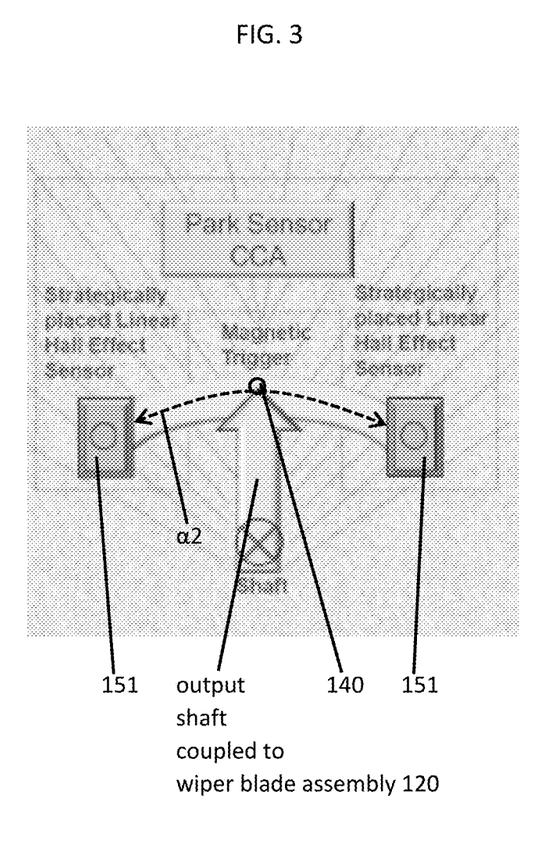
FIG. 3 is an illustration of a layout of a measurement system of a WWS in accordance with embodiments.

With reference to FIGS. 1-3, a windshield wiper system (WWS) 101 is provided for use with an airframe 110, such as an airframe of a vehicle or an aircraft. The airframe 110 is supportive of a windshield 111. The WWS 101 includes a wiper blade assembly 120 and an internal control assembly 130 (see FIG. 2). The wiper blade assembly 120 includes a wiper arm 121 and a wiper blade 122. The wiper blade 122 is attached to a distal end of the wiper arm 121 and is biased toward and onto the windshield 111 by the wiper arm 121. The wiper blade assembly 120 is configured to assume a parked position relative to the windshield 111 unless a pilot/copilot command is entered to initiate a driving of the wiper blade assembly 120 whereby the wiper blade 122 moves across the windshield 111 along a first sweep angle α1. The internal control assembly 130 is configured to drive the wiper blade assembly 120 across the windshield 111 along the first sweep angle α1 such that the wiper blade element moves across the windshield 111 to remove moisture or foreign object debris from the windshield 111.

As shown in FIGS. 2 and 3, the WWS 101 further includes an internal wiper trigger 140 and a measurement system 150.

The internal wiper trigger 140 is disposed to move with the wiper blade assembly 120 and along a second sweep angle α2 (see FIG. 3) that corresponds to the first sweep angle α1. In accordance with embodiments, the internal wiper trigger 140 can be coupled to the wiper arm 121 or another suitable component of the wiper blade assembly 120 (i.e., an output shaft leading to the wiper arm 121) and is configured to generate a magnetic field. As a result of being coupled to the wiper arm 121 or another suitable component of the wiper blade assembly 120, the internal wiper trigger 140 experiences a same or similar loading as the wiper blade assembly 120.

Since the internal wiper trigger 140 is coupled to the wiper arm 121 or another suitable component of the wiper blade assembly 120, the second sweep angle α2 is a same sweep angle as the first sweep angle α1.

The measurement system 150 is configured to monitor a position of the internal wiper trigger 140 relative to the second sweep angle α2 from which a corresponding position of the wiper blade assembly 120 relative to the first sweep angle α1 is measurable. The measurement system 150 is further configured to output a sweep angle feedback signal SAFS, which corresponds to monitoring results, to the internal control assembly 130. In accordance with embodiments, the measurement system 150 can include Hall Effect sensors 151. As shown in FIG. 3, the Hall Effect sensors 151 can be disposed at opposite sides of an output shaft leading to the wiper blade assembly 120 or, more particularly, to the wiper arm 121 and are responsive to the magnetic field generated by the internal wiper trigger 140. As such, the Hall Effect sensors 151 generate a variable duty cycle output that corresponds to the interaction between the Hall Effect sensors 151 and the internal wiper blade trigger 140 (as will be discussed below) and issue the variable duty cycle output to the internal control assembly 130 as the SAFS.

As shown in FIG. 2, the internal control assembly 130 includes a controller 131, a motor 132 and a mechanical gear train and four bar linkage 133. The controller 131 is receptive of the sweep angle feedback signal SAFS and is configured to control a driving of the wiper blade assembly 120. The motor 132 can include or be provided as a brushless DC (BLDC) motor and is operable by a motor drive control signal MDCS that is output from the controller 131. The mechanical gear train and four bar linkage 133 is operably interposed between the motor 132 and the wiper blade assembly 120. The internal control assembly 130 further includes a position feedback loop 134, which generates a position error signal PES for reception by the controller 131, a motor current feedback loop 135, which generates a current error signal CES for reception by the controller 131, and a motor winding temperature feedback loop 136, which generates a motor winding temperature error signal MWTES for reception by the controller 131. The position feedback loop 134, the motor current feedback loop 135 and the motor winding temperature feedback loop 136 are configured in parallel with each other and the position error signal PES, the current error signal CES and the motor winding temperature error signal MWTES are each derived from the motor 132. The controller 131 is configured to control the driving of the wiper blade assembly 120 in accordance with at least the sweep angle feedback signal SAFS and, more particularly, the controller 131 is configured to control the driving of the wiper blade assembly 120 in accordance with the sweep angle feedback signal SAFS and in accordance with the position error signal PES, the current error signal CES and the motor winding temperature error signal MWTES.

Figure 4:
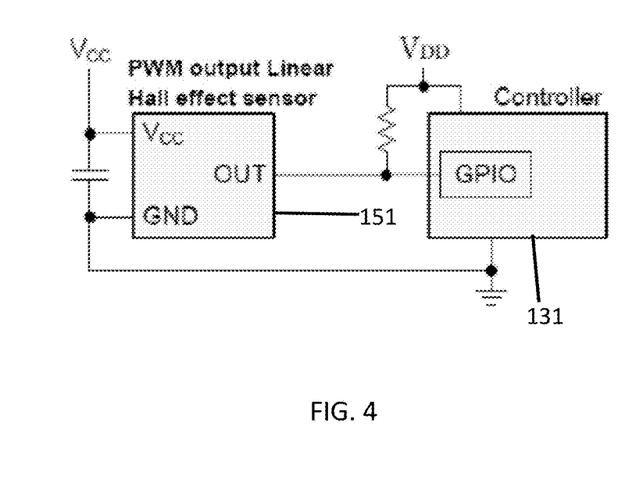
FIG. 4 is a circuit diagram of components of a measurement system and a controller of a WWS in accordance with embodiments.
Figure 5:
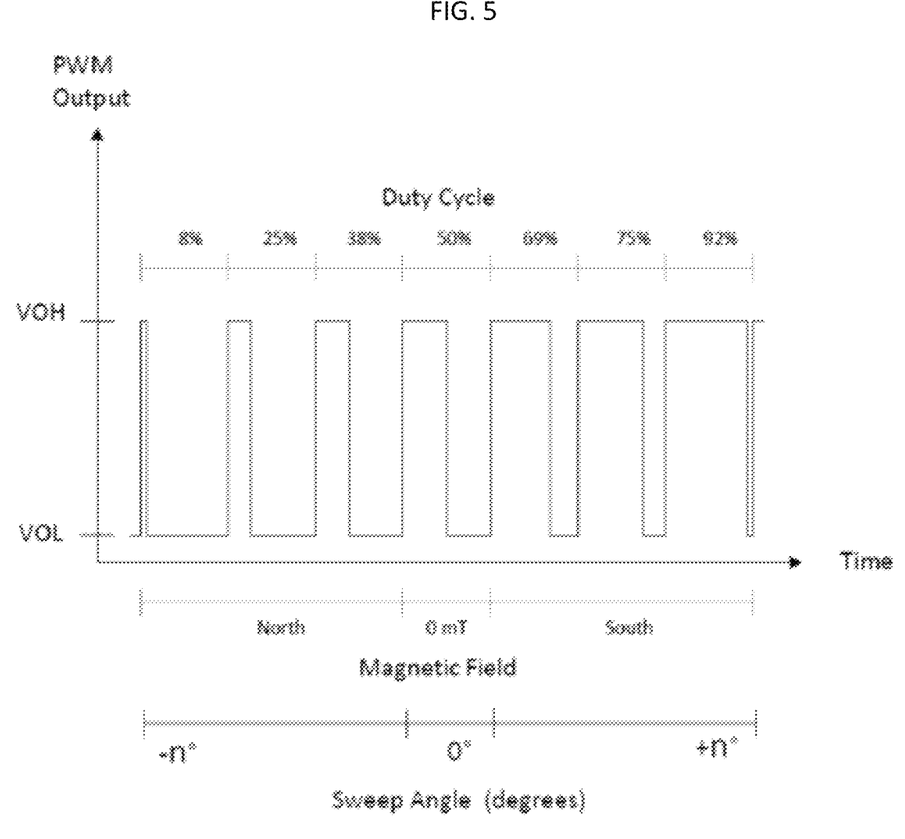
FIG. 5 is a graphical depiction of a relationship between a duty cycle PWM output and a position of a wiper trigger in accordance with embodiments.

With continued reference to FIGS. 1-3 and with additional reference to FIGS. 4 and 5, an output of the Hall Effect sensors 151 will be a variable duty cycle PWM output whose duty cycle is proportional to the magnetic flux density as shown in FIG. 5. This PWM output can be interfaced directly to a GPIO pin of the controller 131 which, on receiving the PWM data, computes the second sweep angle α2 of the internal wiper trigger 140. On extrapolating this data for the actual lengths of the wiper blade assembly 120, the controller 131 can compute the first sweep angle α1 as well as a position of the wiper blade 122.

The information computed by the controller 131 can be communicated to a pilot or co-pilot over a communication interface. If the first sweep angle α1 is found to be deviating from a required specification and/or if a deviated sweep angle could obstruct the visibility of pilots, then an alarm or maintenance message could be communicated to replace the WWS 101 immediately.

The Hall Effect sensors 151 can include or be provided as linear Hall Effect sensors and can be placed perpendicular to the magnetic field produced by the internal wiper trigger 140. The generated analog voltage is provided by the following equation:

$$V_H = R_H(I/t*B)$$

Where $V_H$=output voltage of hall sensor proportional to the magnetic field change, $R_H$=Hall effect co-efficient, I=Current flow through the sensor, t=thickness of sensor in mm and B=Magnetic flux density in Tesla.

The PWM output voltage generated is calibrated and interfaced with the controller 131. The duty cycle of the output voltage is directly proportional to the second sweep angle α2. Hence by this approach, the first sweep angle α1 is effectively computed instead of discrete EoS signals of conventional WWSs.

The PWM output of the Hall Effect sensors 151 can be interfaced to GPIO pins of the controller 131 as shown in FIG. 4. The PWM output helps in eliminating errors due to noisy environments in the measurement system 150. Since the duty cycle is directly proportional to the magnetic flux density around the Hall Effect sensors 151, it is seen that the strength of the magnetic flux density around the Hall Effect sensors 151 is directly proportional to the second sweep angle α2 of the internal wiper trigger 140 (where 'n' of FIG. 5 represents the second sweep angle α2 of the internal wiper trigger 140 from a specific defined position).

Figure 6:
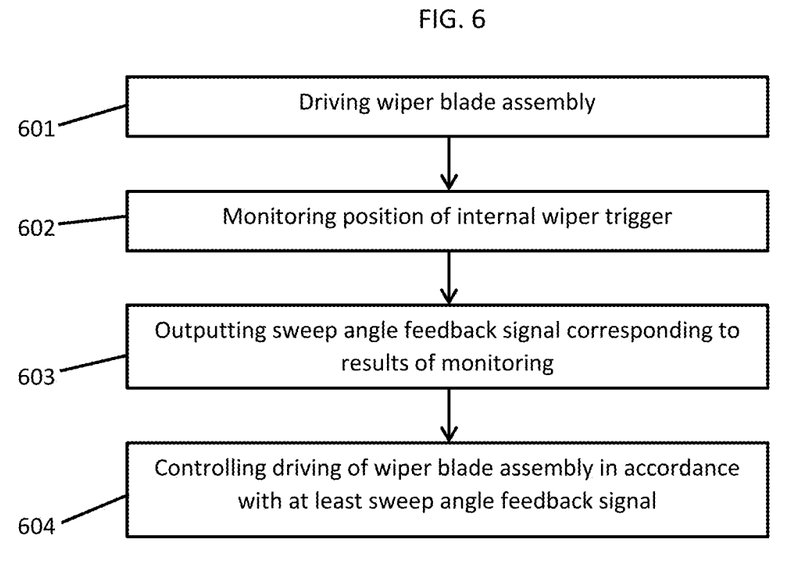
FIG. 6 is a flow diagram illustrating a method of operating a WWS in accordance with embodiments.

With reference to FIG. 6, a method of operating the WWS 101 is provided. As shown in FIG. 6, the method includes driving a wiper blade assembly along a first sweep angle by a controller (601), monitoring a position of an internal wiper trigger disposed to move with the wiper blade assembly from which a corresponding position of the wiper blade assembly relative to the first sweep angle is measurable (602), outputting a sweep angle feedback signal corresponding to results of the monitoring to the controller (603) and controlling the driving of the wiper blade assembly by the controller in accordance with at least the sweep angle feedback signal (604). The controlling of the driving of the wiper blade assembly by the controller of operation 604 can be executed in accordance with the sweep angle feedback signal SAFS and in accordance with the position error signal PES, the current error signal CES and the motor winding temperature error signal MWTES. The monitoring of operation 602 can include generating a magnetic field at an internal wiper trigger disposed to move with the wiper blade assembly and generating a variable duty cycle output responsive to the magnetic field for issuance to the controller as the sweep angle feedback signal.

In accordance with embodiments, the sweep angle feedback signal has a negligible parallax error. In addition, the method further includes at least one of in-flight gear and shaft and real-time sweep angle monitoring based on the sweep angle feedback signal by the controller 131, computing a speed of a motor configured to drive the wiper blade assembly by the controller 131 and facilitating an identification by an operator of ageing issues or failures of the motor, the wiper blade assembly or a gear train interposed between the motor and the wiper blade assembly.

Technical effects and benefits of the enclosure design of the present disclosure are the use of sensors to determine a sweep angle, angular velocity and acceleration of wiper externals and the provision of a redundant system for computing a speed of the motor during events such as Hall Effect sensor system failure. The present disclosure also provides for in-flight health monitoring of shafts and gears of a WWS and angle measurement in existing WWSs. The WWS of the present disclosure has a weight and cost which is substantially a same as a baseline and helps in requirement verification during testing.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A method of operating a windshield wiper system (WWS), the method comprising: driving a wiper blade assembly along a first sweep angle by a controller; monitoring a position of an internal wiper trigger disposed to move with the wiper blade assembly from which a corresponding position of the wiper blade assembly relative to the first sweep angle is measurable; outputting a sweep angle feedback signal corresponding to results of the monitoring to the controller; and controlling the driving of the wiper blade assembly by the controller in accordance with at least the sweep angle feedback signal; wherein the internal wiper trigger is coupled to the wiper arm; wherein the monitoring comprises measuring the position of the internal wiper trigger, and the sweep angle feedback signal corresponds to the position of the internal wiper trigger; wherein the internal wiper trigger moves with the wiper blade assembly along a second sweep angle, which is the same as the first sweep angle, and sensors configured to execute the monitoring are positioned proximate to opposite ends of the second sweep angle.

2. The method according to claim 1, wherein the controlling of the driving of the wiper blade assembly by the controller is executed in accordance with the sweep angle feedback signal and in accordance with motor position, motor current and motor temperature feedback signals.

3. The method according to claim 1, wherein the monitoring comprises:
generating a magnetic field at the internal wiper trigger disposed to move with the wiper blade assembly; and
generating a variable duty cycle output responsive to the magnetic field for issuance to the controller as the sweep angle feedback signal.

4. The method according to claim 1, wherein the sweep angle feedback signal has a negligible parallax error.

5. The method according to claim 1, further comprising at least one of:
in-flight gear and shaft and real-time sweep angle monitoring based on the sweep angle feedback signal;
computing a speed of a motor configured to drive the wiper blade assembly; and
facilitating an identification of ageing issues or failures of the motor, the wiper blade assembly or a gear train interposed between the motor and the wiper blade assembly.

6. A method of operating a windshield wiper system (WWS), the method comprising: driving a wiper blade assembly, which comprises a wiper arm and a wiper blade attached to the wiper arm, across a windshield of a vehicle along a first sweep angle by a controller; monitoring a position of an internal wiper trigger coupled to the wiper blade assembly and disposed to move with the wiper blade assembly from which a corresponding position of the wiper blade assembly relative to the first sweep angle is measurable; outputting a sweep angle feedback signal corresponding to results of the monitoring to the controller; and controlling the driving of the wiper blade assembly by the controller in accordance with at least the sweep angle feedback signal; wherein the internal wiper trigger is coupled to the wiper arm; wherein the monitoring comprises measuring the position of the internal wiper trigger, and the sweep angle feedback signal corresponds to the position of the internal wiper trigger; wherein the internal wiper trigger moves with the wiper blade assembly along a second sweep angle, which is the same as the first sweep angle, and sensors configured to execute the monitoring are positioned proximate to opposite ends of the second sweep angle.

7. The method according to claim 6, wherein the controlling of the driving of the wiper blade assembly by the controller is executed in accordance with the sweep angle feedback signal and in accordance with motor position, motor current and motor temperature feedback signals.

8. The method according to claim 6, wherein the monitoring comprises:
generating a magnetic field at the internal wiper trigger disposed to move with the wiper blade assembly; and
generating a variable duty cycle output responsive to the magnetic field for issuance to the controller as the sweep angle feedback signal.

9. The method according to claim 6, wherein: a motor executes the driving, and a mechanical gear train and four bar linkage is operably interposed between the motor and the wiper blade assembly.

10. The method according to claim 6, wherein the sweep angle feedback signal has a negligible parallax error.

11. The method according to claim 6, further comprising at least one of:
in-flight gear and shaft and real-time sweep angle monitoring based on the sweep angle feedback signal;
computing a speed of a motor configured to drive the wiper blade assembly; and
facilitating an identification of ageing issues or failures of the motor, the wiper blade assembly or a gear train interposed between the motor and the wiper blade assembly.

* * * * *